(12) United States Patent
Huang

(10) Patent No.: US 7,540,606 B2
(45) Date of Patent: Jun. 2, 2009

(54) EYEGLASSES STRUCTURE

(76) Inventor: Chih-Chang Huang, No. 36, Shaluen, Jungsha Tsuen, Anding Shiang, Tainan County (TW)

( * ) Notice: Subject to any disclaimer, the term of this patent is extended or adjusted under 35 U.S.C. 154(b) by 0 days.

(21) Appl. No.: 11/898,379

(22) Filed: Sep. 12, 2007

(65) Prior Publication Data
US 2009/0066906 A1 Mar. 12, 2009

(51) Int. Cl.
*G02C 7/08* (2006.01)
(52) U.S. Cl. .............................. 351/57; 351/47; 351/149
(58) Field of Classification Search ................... 351/41, 351/47, 48, 57, 58, 140, 143, 147, 149
See application file for complete search history.

(56) References Cited
U.S. PATENT DOCUMENTS 5,614,963 A * 3/1997 Parker ......................... 351/47
5,894,335 A * 4/1999 Hoffman ..................... 351/47
5,943,114 A * 8/1999 Grendelmeier ............... 351/47

* cited by examiner

*Primary Examiner*—Huy K Mai
(74) *Attorney, Agent, or Firm*—Rosenberg, Klein & Lee

(57) ABSTRACT

An eyeglasses structure includes an eyeglasses main body, and an eyeglasses accessory; the eyeglasses main body has several detainment holes on a rim thereof; the eyeglasses accessory has several embedded posts corresponding to the detainment holes of the rim of the eyeglasses main body to be embedded in the detainment holes respectively; each of the embedded posts having at least one gaps on one end thereof that is inserted in a corresponding said detainment hole; owing to the gaps, the embedded ends of the embedded posts are contractible and resilient, and they will tend to spring back to their original position to be tight in the detainment holes without possibility of falling off after they are inserted in the detainment holes.

9 Claims, 5 Drawing Sheets

EYEGLASSES STRUCTURE

BACKGROUND OF THE INVENTION

1. Field of the Invention

The present invention relates to an eyeglasses structure, more particularly one, which includes contractible and resilient posts formed with gaps to be tightly embedded in detainment holes of an eyeglasses main body to fasten an eyeglasses accessory to the main body.

2. Brief Description of the Prior Art

People wear sunglasses to protect the eyes from the sun's glare and ultraviolet rays when they are outdoors.

Besides serving to protect the eyes from the sun's glare and ultraviolet rays, sunglasses are a kind of personal adornments. Therefore, common sunglasses, whose lenses aren't intended to correct visual defects, come in a wide variety of colors and designs to agree with different people's likings. Sunglasses with lenses serving to correct visual defects don't come in as many different colors and styles as common sunglasses because there is a relatively small market for them. Therefore, sunglasses with lenses serving to correct visual defects aren't mass-produced, and are more expensive than common ones usually. Consequently, there aren't as many different styles of eyesight-assisting sunglasses as common sunglasses in the market to satisfy those consumers who like to buy and use fancy things.

Therefore, the industry develops a kind of combination eyeglasses structure as shown in FIG. 6. Such an eyeglasses structure includes a pair of sunglasses 3, and an eyeglasses accessory 4 equipped with lenses serving to correct visual defects. The sunglasses 3 include a rim 31, which has several detainment holes 32 thereon. The eyeglasses accessory 4 has cylindrical embedded posts 41 projecting from it to be embedded in the detainment holes 32 of the rim 31 of the sunglasses 3. In assembly, the eyeglasses accessory 4 is fastened to the sunglasses 3 with the cylindrical embedded posts 41 being inserted in the detainment holes 32. Therefore, besides serving to protect the wearer's eyes from the sun's glare, the eyeglasses can correct the wearer's visual defects as well. And, the manufacturers are allowed to make such combination eyeglasses come in a wide variety of colors and styles to satisfy different consumers.

However, it would be difficult to insert the cylindrical embedded posts 41 in the detainment holes 32 if the posts 41 are too big. And, the cylindrical embedded posts 41 will be loose in the detainment holes 32 if their diameter is too small. Therefore, such eyeglasses have to be precision-manufactured in respect of the size of the cylindrical embedded posts 41 and the detainment holes 32. Consequently, the manufacturing cost increases.

Furthermore, the cylindrical embedded posts 41 would wear to have a reduced diameter after the eyeglasses accessory 4 is separated from and put back on the sunglasses 3 many times. Consequently, the cylindrical embedded posts 41 will be loose in the detainment holes 32.

SUMMARY OF THE INVENTION

It is a main object of the present invention to provide an improvement on an eyeglasses structure, wherein the eyeglasses accessory has contractible and resilient embedded posts inserted in detainment holes of the eyeglasses main body.

It is another object of the present invention to provide an eyeglasses structure that is relatively easy and low-cost to manufacture.

An eyeglasses structure according to an embodiment of the present invention includes an eyeglasses main body, and an eyeglasses accessory; the eyeglasses main body has several detainment holes on a rim thereof; the eyeglasses accessory has several embedded posts corresponding to the detainment holes of the rim of the eyeglasses main body to be embedded in the detainment holes respectively; each of the embedded posts having at least one gaps on one end thereof that is inserted in a corresponding said detainment hole; owing to the gaps, the embedded ends of the embedded posts are contractible and resilient, and they will tend to spring back to their original position to be tight in the detainment holes after they are embedded in the detainment holes.

The eyeglasses main body and the embedded posts don't have to precision-manufactured in order for the embedded posts and the detainment holes to match perfectly with each other in size. Therefore, the manufacturing cost of the present invention is relatively low as compared with the prior art.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
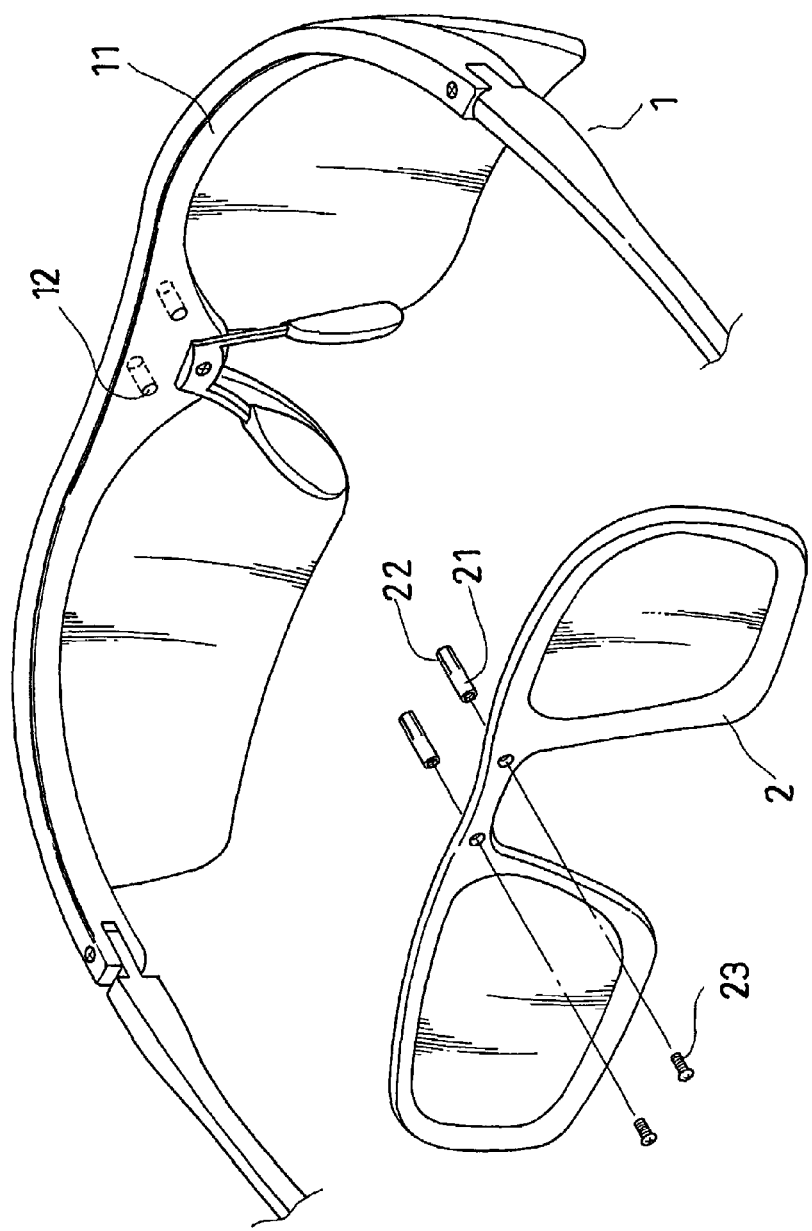
FIG. 1 is an exploded perspective view of the present invention.

Referring to FIG. 1, a preferred embodiment of an eyeglasses structure of the present invention includes an, eyeglasses main body 1, and an eyeglasses accessory 2, which is fitted to a rim 11 of the eyeglasses main body 1.

The eyeglasses main body 1 is usually a pair of sunglasses. The rim of the eyeglasses main body 1 has several detainment holes 12 on an upper edge of a middle bridge thereof.

Figure 2:
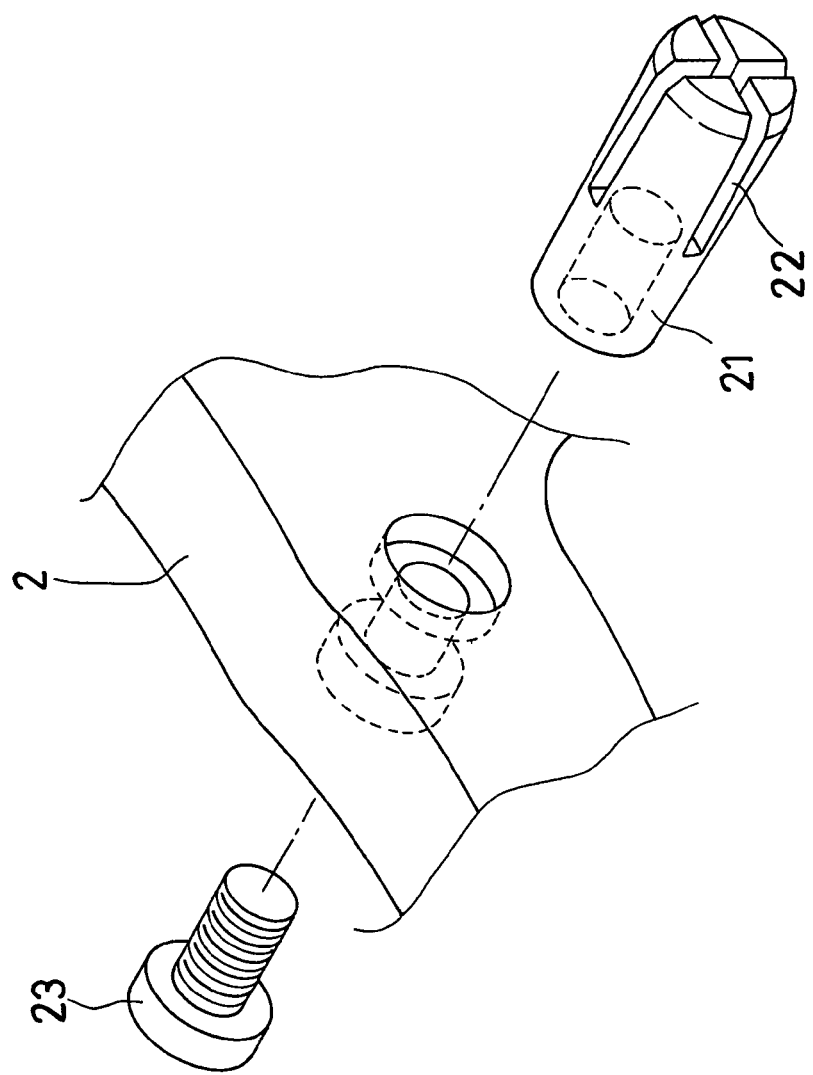
FIG. 2 is a fragmentary exploded perspective view of the present invention.
Figure 4:
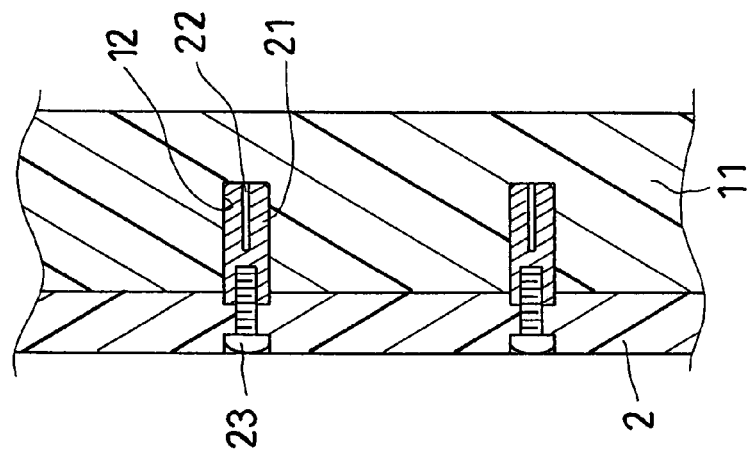
FIG. 4 is a partial sectional view of the present invention in assembly (2)

The eyeglasses accessory 2 can be equipped with lenses intended to correct visual defects, and it has such a shape and style as to match with the eyeglasses main body 1. The eyeglasses accessory 2 has thereon several embedded posts 21 corresponding to the detainment holes 12 of the rim 11 of the eyeglasses main body 1 to be embedded in the detainment holes 12 respectively. The embedded posts 21 have at least one gaps 22 on first ends thereof that are joined to the embedding holes 12; thus, the first ends of the embedded posts 21 are contractible and resilient. Furthermore, the gaps 22 are preferably formed in such a manner as to intersect in a cross pattern, as shown in FIG. 2.

In addition, referring to FIG. 2 again, the embedded posts 21 and the eyeglasses accessory 2 can-be joined together by means of screws 23. The embedded posts 21 are preferably made of copper.

Figure 3:
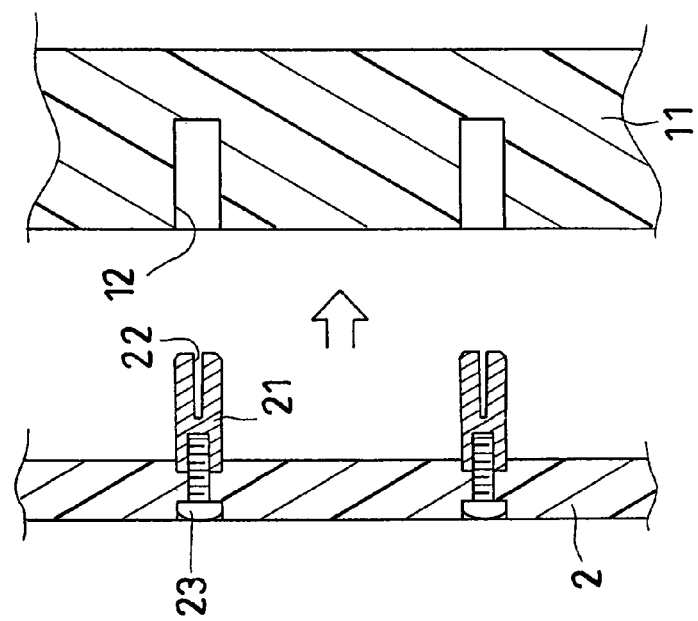
FIG. 3 is a partial sectional view of the present invention in assembly (1)

Referring to FIGS. 1 and 3, to put the eyeglasses to use, first the user embeds his/her lenses in the eyeglasses accessory 2, which lenses are provided so as to correct the user's visual defects. Next, the eyeglasses accessory 2 is joined to the eyeglasses main body 1 with the embedded posts 21 being inserted in the detainment holes 12 respectively.

Figure 5:
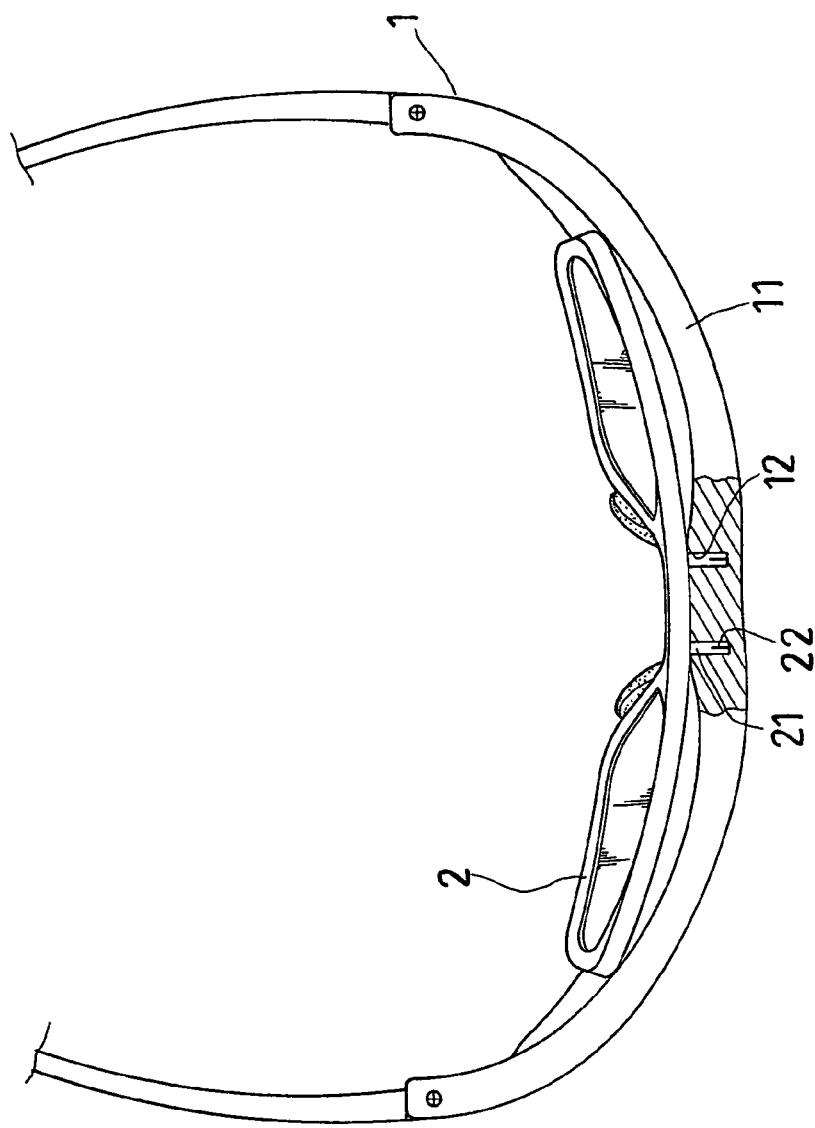
FIG. 5 is a top view with a partial sectional view of the present invention.
Figure 6:
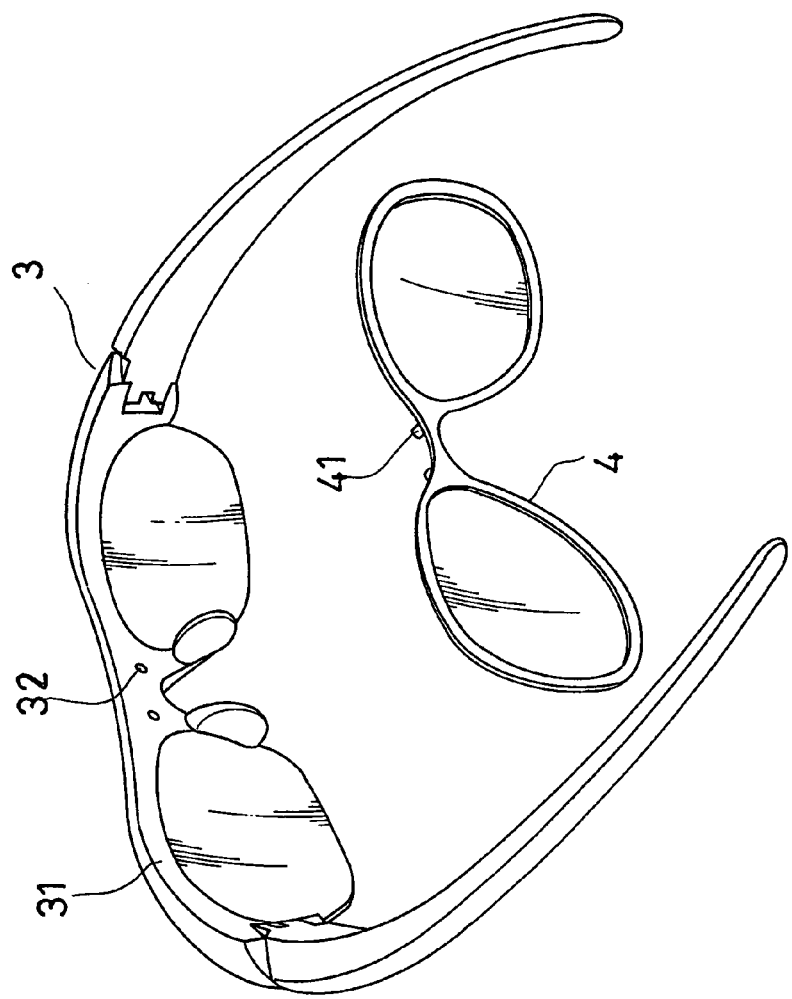
FIG. 6 is an exploded perspective view of the prior art.

Because the embedded first ends of the embedded posts 21 are formed with the gaps 22, in assembly, the embedded first ends of the embedded posts 21 will be contracted to have a reduced diameter so as to be easily passed into the detainment holes 12. And, because the first ends of the embedded posts 21 are resilient, and tend to expand immediately after they have been contracted, they will expand to be tight in the detainment holes 12. Consequently, the embedded posts 21 are securely embedded in the detainment holes 12, and the eyeglasses accessory 2 is joined to the eyeglasses main body 1, as shown in FIG. 5.

Because the embedded first ends of the embedded posts 21 have the gaps 22 thereon, they are contractible and resilient, and the eyeglasses main body 1 and the embedded posts 21 don't have to precision-manufactured in order for the embedded posts 21 and the detainment holes 12 to match perfectly with each other in size. Consequently, the manufacturing cost of the eyeglasses decreases.

The eyeglasses accessory 2 can be used together with various colors and designs of eyeglasses main bodies. Therefore, the user of the eyeglasses accessory 2 can change from one eyeglasses main body to another frequently, and the embedded posts 21 will wear to have a smaller diameter. Similarly, the detainment holes 12 of the eyeglasses main body 1 will become larger after the eyeglasses have been used for a certain length of time. Nevertheless, the embedded posts 21 of the eyeglasses accessory 2 still can be securely embedded in the detainment holes 12 of the eyeglasses main body 1 because the embedded posts 2 are formed with the gaps 22 to be contractible and resilient. Consequently, the eyeglasses accessory 2 and the eyeglasses main body 1 still can be secured together without possibility of both falling apart accidentally.

From the above description, it can be seen that the present invention has the following advantages:

1. Because the embedded posts are formed with the gaps to be contractible and resilient on the first ends, in assembly, the first ends of the embedded posts will be contracted to have a reduced diameter so as to be easily passed into the detainment holes. And, the embedded first ends of the embedded posts will expand to be tight in the detainment holes. Consequently, the embedded posts are secured in the detainment holes without possibility of falling loose.

2. The embedded first ends of the embedded posts are formed with the gaps to be contractible and resilient. Therefore, the eyeglasses main body and the embedded posts don't have to precision-manufactured in order for the embedded posts and the detainment holes to match perfectly with each other in size. Consequently, the eyeglasses of the present invention are relatively easy and low-cost to manufacture.

3. The eyeglasses accessory can be used together with various colors and designs of eyeglasses main bodies. Therefore, the user of the eyeglasses accessory can change from one eyeglasses main body to another frequently, and the embedded posts will wear to have a smaller diameter. Similarly, the detainment holes will become larger after the eyeglasses have been used for a certain length of time. Nevertheless, the embedded posts still can be securely embedded in the detainment holes without possibility of falling loose accidentally because the embedded posts are formed with the gaps to be contractible and resilient.

What is claimed is:

1. An eyeglasses structure, comprising:
an eyeglasses main body, the eyeglasses main body having a plurality of detainment holes on a rim thereof; and
an eyeglasses accessory adjacent to the rim of the eyeglasses main body, the eyeglasses accessory having detachably coupled thereto a plurality of embedded posts corresponding to the detainment holes of the rim of the eyeglasses main body to be embedded in the detainment holes respectively; each of the embedded posts having at least one gap formed at one end thereof, each of the embedded posts thereby configured to remain joined to a corresponding one of said detainment holes in force fit manner.

2. The eyeglasses structure as claimed in claim 1, wherein said at least one gaps intersect.

3. The eyeglasses structure as claimed in claim 1, wherein said at least one gaps intersect in such a manner as to form a cross pattern.

4. The eyeglasses structure as claimed in claim 1, wherein the embedded posts and the eyeglasses accessory are secured together by means of screws.

5. The eyeglasses structure as claimed in claim 1, wherein the embedding holes are formed on an upper edge of a middle of the eyeglasses main body.

6. The eyeglasses structure as claimed in claim 1, wherein the eyeglasses accessory are equipped with lenses serving to correct visual defects.

7. The eyeglasses structure as claimed in claim 1, wherein the eyeglasses main body is a pair of sunglasses.

8. The eyeglasses structure as claimed in claim 1, wherein the embedded posts are made of metallic materials.

9. The eyeglasses structure as claimed in claim 1, wherein the embedded posts are made of copper.

\* \* \* \* \*